United States Patent [19]

Curiel

[11] Patent Number: 4,563,727
[45] Date of Patent: Jan. 7, 1986

[54] SELF-CHARGING SOLAR BATTERY

[76] Inventor: Raymond F. Curiel, P.O. Box 30355, Phoenix, Ariz. 85046

[21] Appl. No.: 690,966

[22] Filed: Jan. 14, 1985

[51] Int. Cl.$^4$ .................. F21L 13/00; H01M 12/00
[52] U.S. Cl. .................................. 362/183; 136/291; 136/251; 429/9; 429/100
[58] Field of Search .................. 429/9; 136/291; 362/157, 183, 192, 202, 208; 320/2

[56] References Cited

U.S. PATENT DOCUMENTS

| 3,344,334 | 9/1967 | Rubin | 320/2 |
| 4,009,051 | 2/1977 | Kazis et al. | 320/15 |
| 4,062,371 | 12/1977 | Bolen | 135/66 |
| 4,209,346 | 6/1980 | King | 136/246 |
| 4,293,808 | 10/1981 | Varadi et al. | 320/2 |

FOREIGN PATENT DOCUMENTS

| 3105298 | 9/1982 | Fed. Rep. of Germany | 136/291 |
| 2017359 | 10/1979 | United Kingdom | 136/291 |

OTHER PUBLICATIONS

Solarex Guide to Solar Electricity, Solarex Corporation, Rockville, Md. (1979), p. 101.

Primary Examiner—Aaron Weisstuch
Attorney, Agent, or Firm—Warren F. B. Lindsley

[57] ABSTRACT

A self-charging battery comprising a rechargeable nickel-cadmium cell and a solar electric panel. Sunlight passing through the transparent housing excites the solar panel which then supplies recharging current to the nickel-cadmium cell.

15 Claims, 23 Drawing Figures

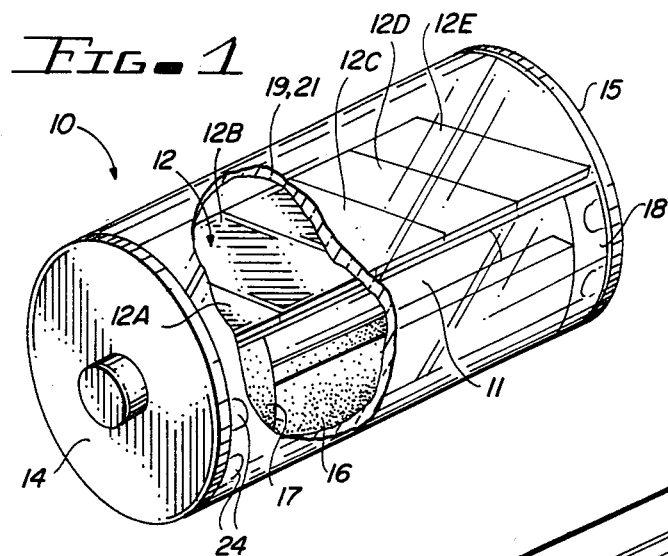
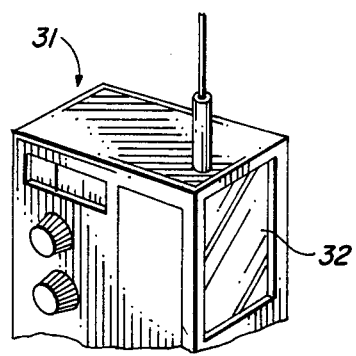
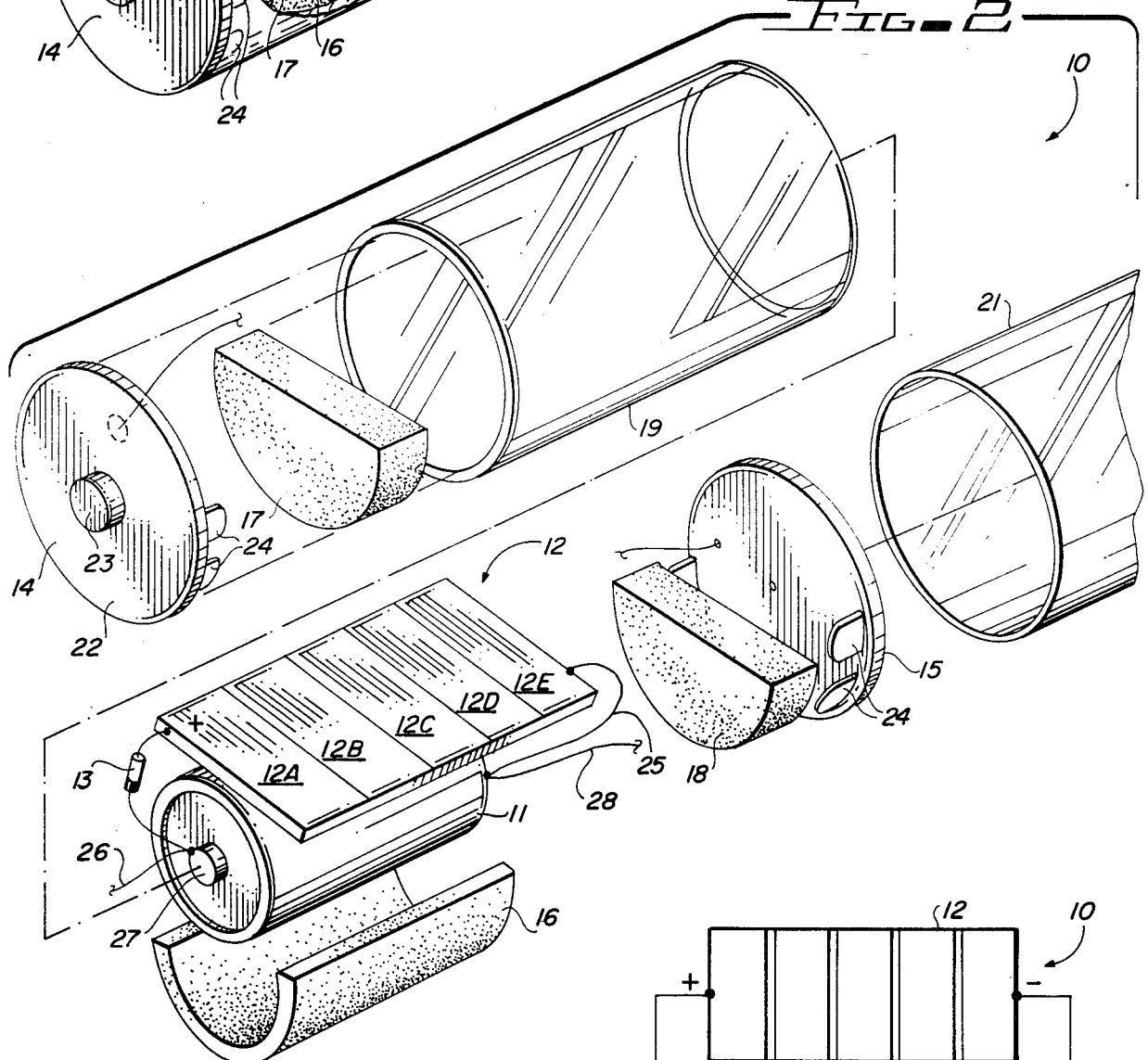
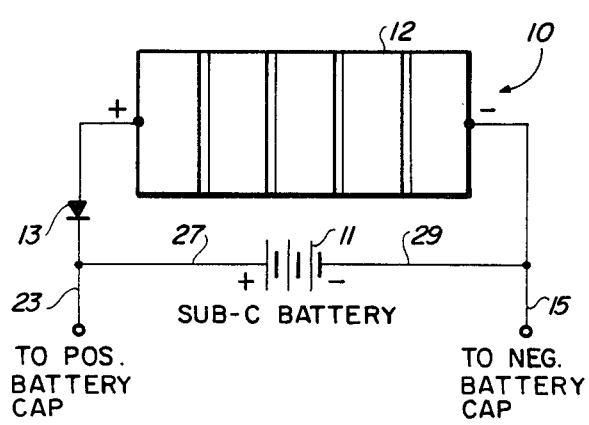

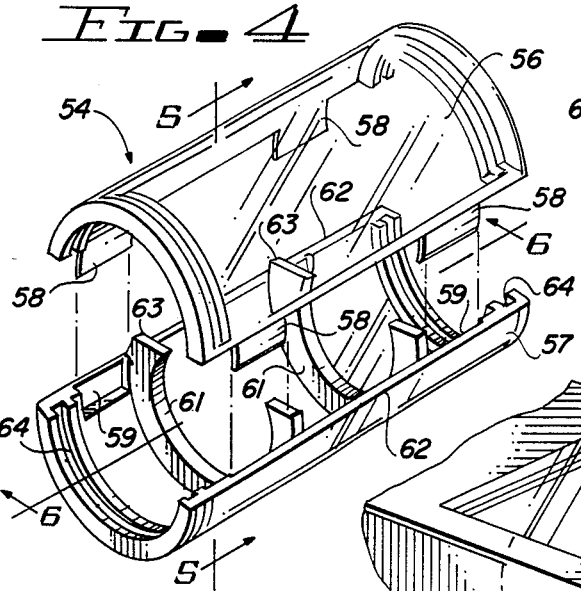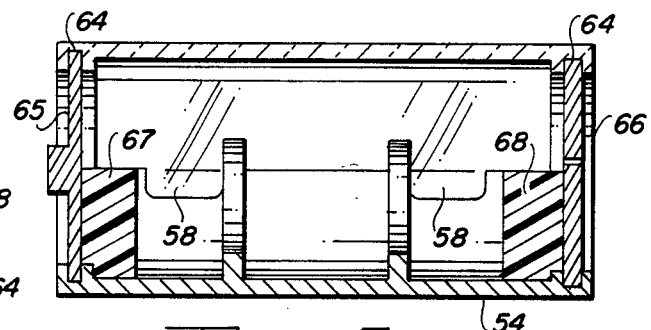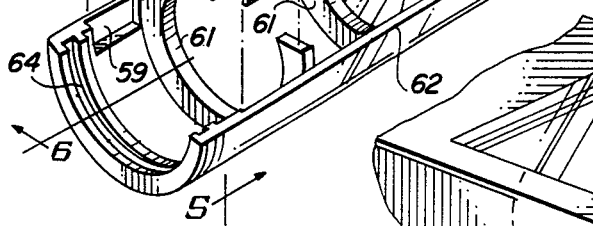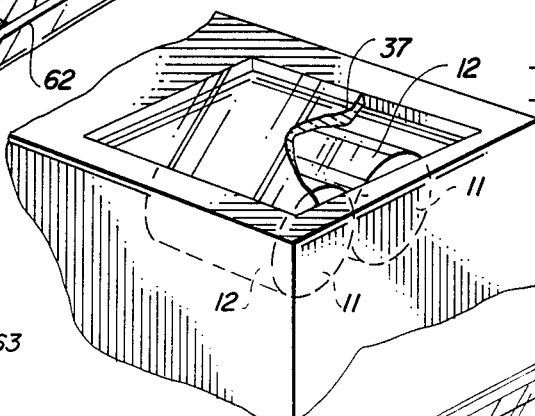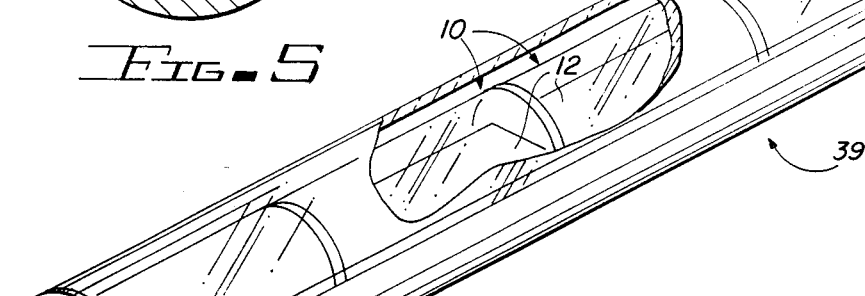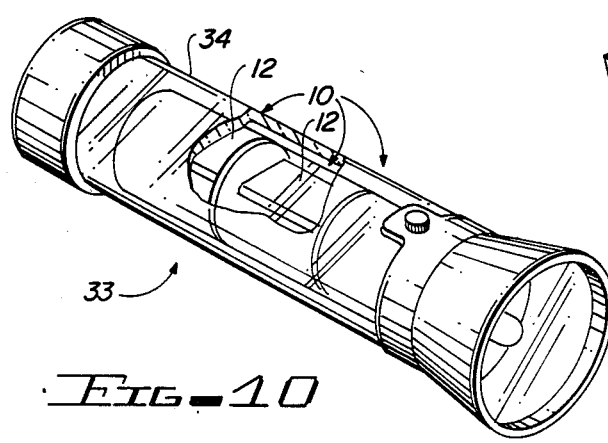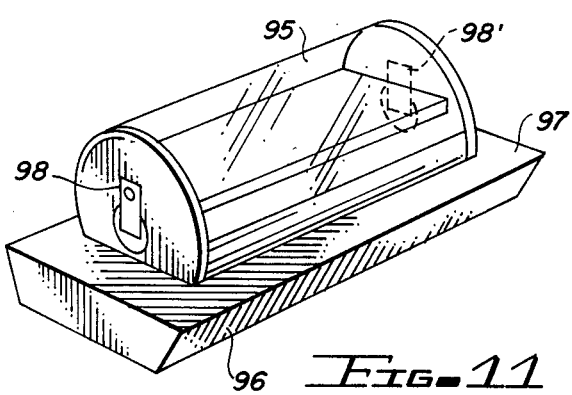

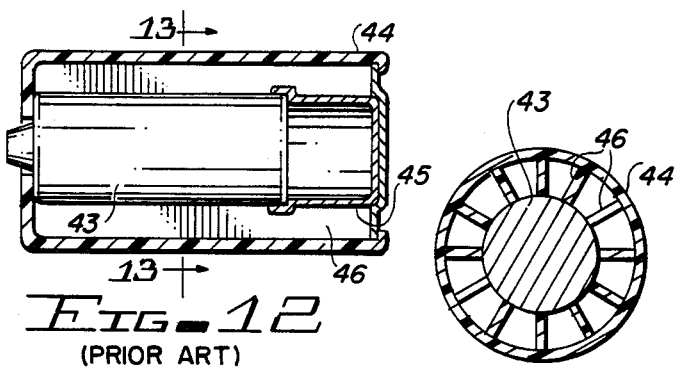
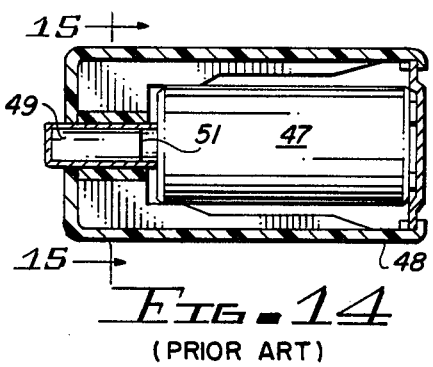
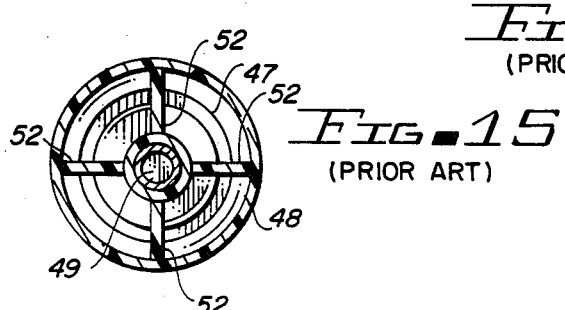
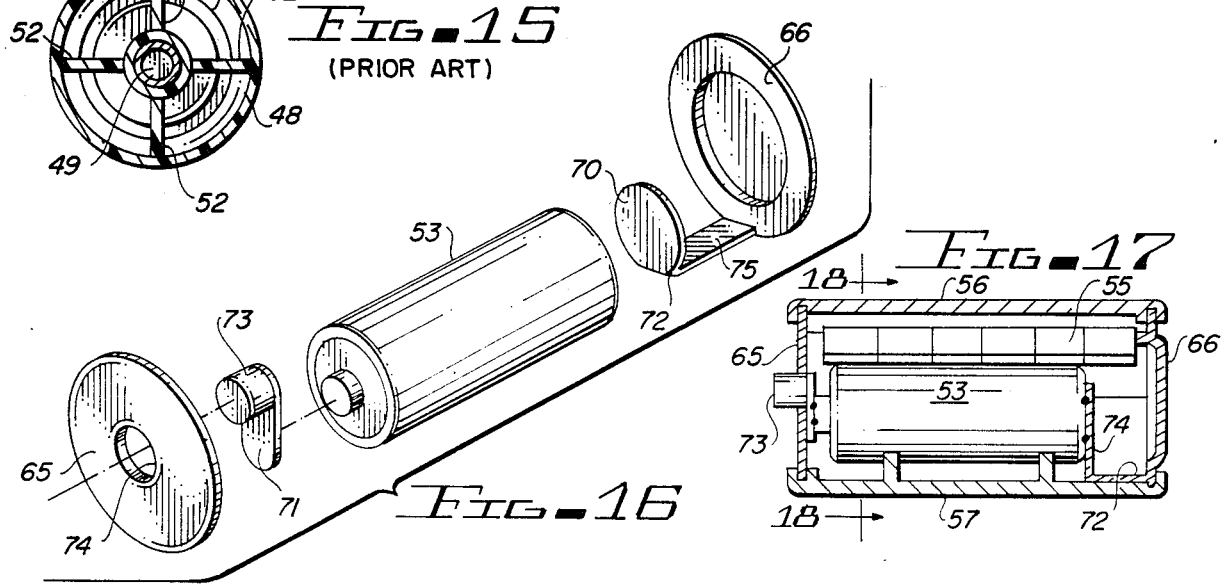
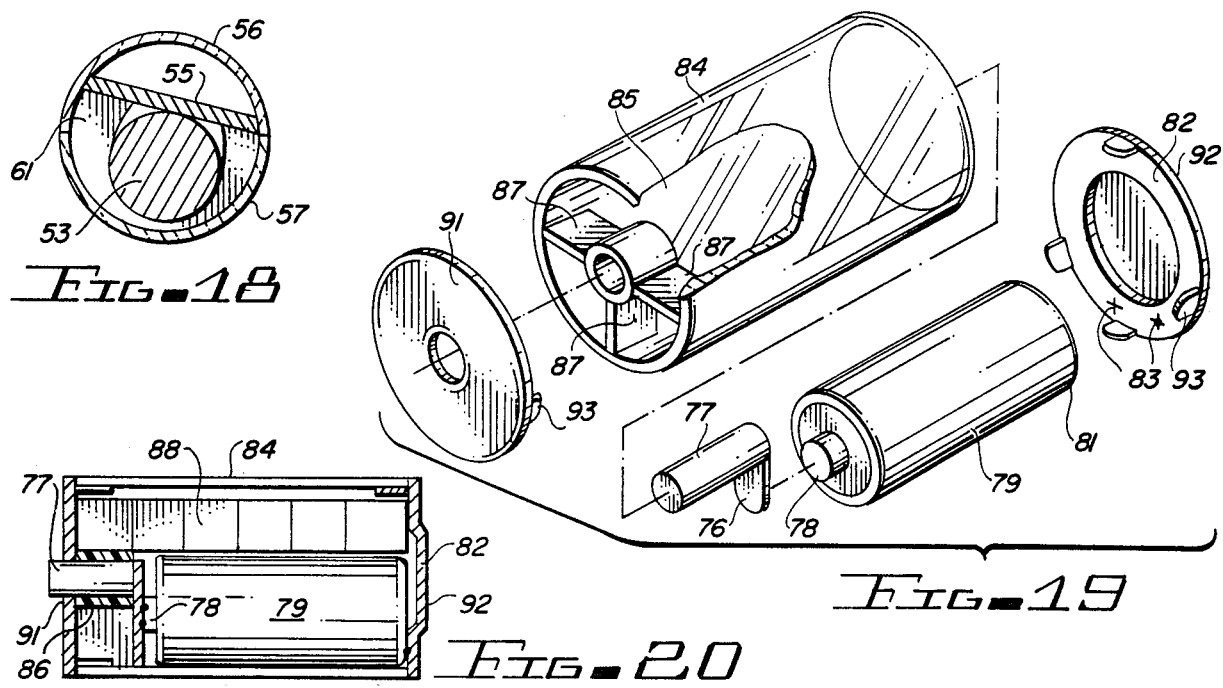

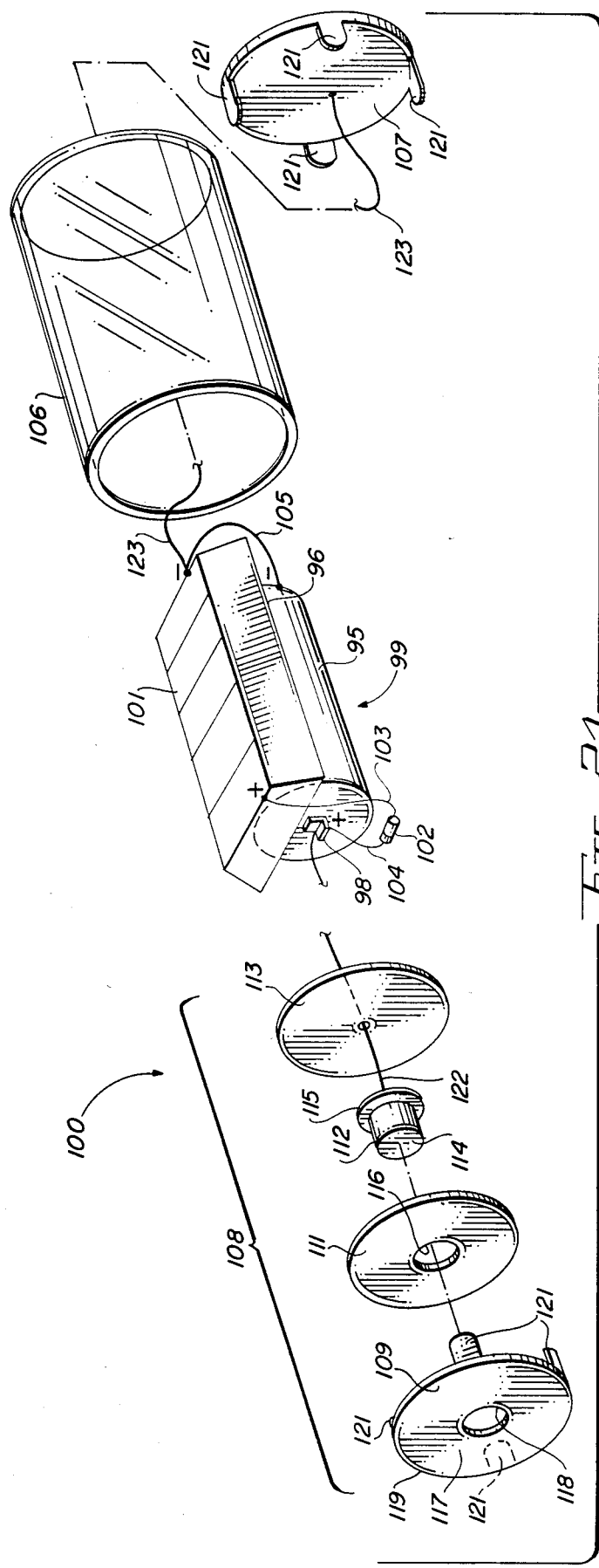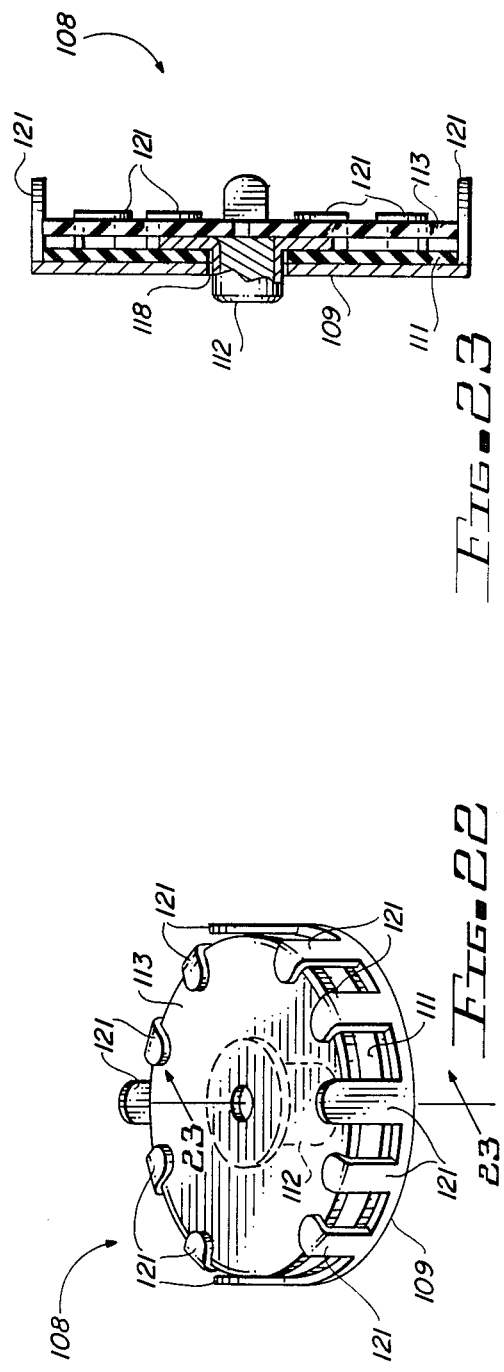

SELF-CHARGING SOLAR BATTERY

BACKGROUND OF THE INVENTION

Electric storage batteries have been in use for many years. Probably the most common use is in emergency or portable lighting devices such as the ordinary flashlight. The quality of the batteries has improved steadily along with the numbers of different applications for their use.

One of the more significant improvements is the development and commercial availability of rechargeable batteries, such as nickel-cadmium and sealed lead-acid batteries. Devices utilizing rechargeable batteries are frequently marketed with built-in charging circuits and provision for plugging into an electric wall outlet for recharging between periods of use.

It is frequently the case, however, that a battery operated device is called for in a given application because it involves operation in a remote area where electric power is not available. In many such applications, some form of recharging capability is particularly desired.

Consider, for example, flashlights, lanterns and other battery operated lighting devices which are carried for emergency use on lifeboats, planes, ships and various types of land vehicles. In a serious emergency, the user might become isolated for days or even weeks in a remote area. Without a recharging capability, the batteries can become depleted before help arrives. In such a situation, a means for recharging a flashlight or other signalling means could well make the difference between life and death.

Numerous other uses exist for a remote area recharging capability for small batteries. Examples include security devices for remote locations, remote repeater stations, beacons for navigational buoys at sea, emergency radios or other types of communications equipment, and various types of armed forces equipment employed on extended scouting forays.

An important need thus exists for a battery that may be recharged conveniently in a remote area. Because other electrical power sources are generally not available to provide the energy for recharging, some other source, such as solar energy, will have to be employed.

SUMMARY OF THE INVENTION

In accordance with the invention claimed, a self-charging solar battery is provided for use in remote locations. The solar battery incorporates a conventional rechargeable battery such as a sealed lead-acid or nickel-cadmium battery along with a solar cell array. The solar cells are exposed to sunlight through a transparent window in the battery case and they supply recharging current to the battery between periods of use.

It is, therefore, an object of the present invention to provide a self-charging battery for use in remote locations.

Another object of the invention is to provide a self-charging battery which relies on solar energy for the recharging action.

A further object of the invention is to provide such a self-charging solar battery as an integral unit housed in a standard battery case such as that of an ordinary "D" cell so that the battery may be employed directly in any of the many lighting and other devices and appliances already commercially available for use with standard battery types.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings in which:

FIG. 1 is a perspective view of a self-charging solar battery of the invention with the outer casing partly cut away to reveal details of the interior construction;

FIG. 2 is an exploded view of the self-charging battery of FIG. 1;

FIG. 3 is a schematic diagram showing interconnections of the elements of the battery of FIGS. 1 and 2;

FIG. 4 is an exploded perspective view of a case construction intended for use in an alternate construction of the self-charging battery of the invention;

FIG. 5 is a cross-sectional end view of the case of FIG. 4 as viewed along line 5—5 with a "sub-c" battery and a solar panel installed;

FIG. 6 is a cross-sectional view of the case of FIG. 4 as viewed along line 6—6;

FIG. 7 is a partial perspective view of a self-charging solar battery pack embodying the principles taught in the present invention;

FIG. 8 is a perspective view of a self-charging solar power tube embodying the principles taught in the present invention;

FIG. 9 is a partial perspective view of a portable radio or similar device incorporating the self-charging solar battery of the invention;

FIG. 10 is a perspective view of a flashlight incorporating the self-charging solar battery of the invention;

FIG. 11 is a perspective view of an encapsulated battery sub-assembly employed in an alternate construction of the self-charging battery of the invention;

FIG. 12 is a cross-sectional view of a prior art battery construction in which a "sub-c" size battery is mounted inside a "D" size battery case;

FIG. 13 is a cross-sectional view of the battery construction of FIG. 12 as seen along line 13—13 of FIG. 12;

FIG. 14 is a cross-sectional view of a different prior art battery construction in which a "sub-c" size battery is mounted inside a "D" size battery case;

FIG. 15 is a cross-sectional view of the battery construction of FIG. 14 as seen along line 15—15 of FIG. 14;

FIG. 16 is an exploded view of the internal elements of an embodiment of the self-charging battery of the invention;

FIG. 17 is a cross-sectional side view of an embodiment of the invention in which the internal elements of FIG. 16 are mounted in a case similar to the case shown in FIG. 4;

FIG. 18 is a cross-sectional view of the battery of FIG. 17 as seen along line 18—18 of FIG. 17;

FIG. 19 is an exploded view of an alternate construction of the self-charging battery of the invention based on the prior art conventional battery construction of FIGS. 14 and 15;

FIG. 20 is a cross-sectional view of a fully assembled self-charging battery of the invention utilizing the construction of FIG. 19;

FIG. 21 is an exploded view of a self-charging battery incorporating the battery sub-assembly of FIG. 11;

FIG. 22 is a perspective view of a terminal and end-cap assembly employed in the battery of FIG. 21; and FIG. 23 is a cross-sectional view of the assembly of FIG. 22 as seen along the line 23—23.

DESCRIPTION OF THE PREFERRED EMBODIMENT

Referring more particularly to the drawings by characters of reference, FIGS. 1-3 disclose a self-charging solar battery 10 embodying the invention wherein the solar battery comprising a nickel-cadmium battery 11, a solar panel 12, a diode 13, positive and negative end caps 14 and 15, respectively, battery insulator and spacer 16, end spacers 17 and 18, cylindrical tube 19 and shrink-fit insulating cover 21 which cover holds on the assembly its end caps and serves as an advertising medium.

The nickel-cadmium battery 11 is a common form of rechargeable battery. Other types of rechargeable batteries suitable for this application include gel and sealed lead-acid batteries. All types are readily available from a number of manufacturers in various case sizes including the common "D" cells and "sub-c" cells. As pointed out in a later part of this specification, the "sub-c" cells are sometimes packaged inside the larger "D" cell cases to permit the use of these small but powerful batteries in a housing that was originally intended for use with the "D" cell batteries. The battery 11 shown in FIGS. 1 and 2 is a "sub-c" cell.

The solar panel 12, for example, may be made up of any number of individual photo-voltaic solar cells shown herein, for example, as five cells 12A-E. This panel is capable of delivering as much as 55 milliamperes at 2.25 volts when exposed to direct sunlight.

As shown most clearly in FIG. 3, the positive terminal of panel 12 is connected through diode 13 to the positive terminal of battery 11, the cathode of diode 13 is connected to the positive terminal of battery 11, and the anode of diode 13 is connected to the positive terminal of panel 12. The negative terminals of battery 11 and panel 12 are tied directly together. Diode 13 may be any one of several types commonly available, such as silicon or germanium. Silicon diodes are preferred because of their greater reliability, but germanium diodes have the advantage that their relatively lower forward voltage drop permits a higher electrical efficiency, particularly at the low operating voltages involved in this application.

Insulator and spacer 16 and end spacers 17 and 18 are preferably made of a flexible insulating material such as polyurethane foam which, in addition to providing electrical insulation, affords a means for clamping battery 11 in position relative to the other elements of the assembly.

As shown in FIG. 2, insulator 16 is formed from a flat sheet of this material that wraps around the lower part of the cylindrical body of battery 11.

End spacers 17 and 18 are shaped in the form of 180 degree sections of short cylinders. The diameter of their cylindrical surfaces is equal to the inside diameter of tube 19 and the sum of their lengths makes up the difference between the length of the "sub-c" cell and the "D" cell package that is approximated by the overall configuration of battery 10.

The positive end cap 14 has a flat circular body 22 with a centered cylindrical terminal 23 extending from one face. A number of tabs 24 extend perpendicularly from the periphery of the opposite face. The tabs 23 are omitted over one portion of the periphery to provide clearance for panel 12.

Negative end cap 15 is similar to cap 14 but has no terminal 23 at its center.

Tube 19 is made of a sturdy, transparent plastic such as a polycarbonate material. Its length and diameter correspond closely to the body dimensions of the standard "D" cell.

The assembly of battery 10 proceeds as follows. Panel 12 is first positioned atop battery 11 as shown in FIG. 2. Diode 13 is soldered in place as indicated and the negative terminals of panel 12 and battery 11 are connected together by means of a wire 25 soldered at both ends. A first lead wire 26 is soldered to the positive battery terminal 27 and a second lead wire 28 is connected to the case of battery 11 at the opposite end, the case constituting, in this instance, the negative terminal 29 of battery 11. The assembled battery 11, insulator 16, panel 12, and diode 13 are next inserted into tube 19 with lead wires 26 and 28 extending at opposite ends. Spacer 17 is then pressed into position at the negative end of battery 11 and spacer 18 is pressed into position at the opposite end, the angular positions of spacers 17 and 18 being adjusted to assure that the ends of the battery 11 are covered by the adjacent semicircular faces of the spacers and also to assure that the flat rectangular faces of the spacers 17 and 18 rest against the under surface of the panel 12, thereby serving as a support for panel 12. The ends of lead wires 26 and 28 are now soldered to end caps 14 and 15, respectively, and the caps are pressed into the ends of tube 19 in which position they are secured by tabs 24. As the end caps are pressed into position, battery 11 becomes wedged between end spacers 17 and 18 which are compressed by the wedging action to hold battery 11 firmly in position so that any shock or vibration normally experienced by battery 10 will not result in damage to the fragile solar panel 12. In the final step of the assembly operation, the transparent cover 21 is slipped over tube 19 and is shrunk to a tight fit thereabout by the application of heat as from a shrink tunnel. Terminal 27 now serves as the positive terminal of battery 10 and end cap 15 serves as the negative terminal.

Any printing that is applied to cover 21 is positioned on the side of battery 10 that does not cover panel 12 so as not to interfere with the application of solar radiation to panel 12.

In use, the self-charging battery 10 may be installed in an ordinary flashlight or any other device designed to operate from a standard "D" cell battery. When the charge of battery 11 becomes depleted because of use, battery 10 is removed from the flashlight or other device and is placed in sunlight with panel 12 facing the sun. Sunlight passes through cover 21 and tube 19 and radiates solar panel 12, generating a voltage across panel 12 by photo-voltaic action. When the generated voltage exceeds the voltage of battery 11 and overcomes the intrinsic forward voltage drop of diode 13, a charging current flows from the positive terminal of panel 12 through diode 13, into the positive terminal 27 of battery 11, through battery 11 and out the negative terminal 29 of battery 11 to the negative terminal of panel 12. By this means, the charge of battery 11 is restored and battery 10 is thus conditioned for further use.

It will be appreciated that while battery 10 may be employed as just described in devices whose design did not contemplate the self-charging feature of battery 10, minor changes may be readily incorporated in the designs of such devices to accommodate or more conveniently utilize the self-charging feature.

FIG. 9, for example, shows a portable radio or "walkie-talkie" 31 incorporating a transparent window 32 through which sunlight may be admitted to radiate panel 12 of a self-charging battery 10 which has been installed adjacent the window.

In FIG. 10, a flashlight 33 with a transparent case 34 incorporates solar batteries, such as batteries 10, and their embodied solar panels 12 to maintain its electrical potential while still mounted inside flashlight 33.

FIG. 7 suggests the mounting of two or more self-charging battery assemblies, including batteries 11 and solar panels 12, positioned behind a transparent window 37. The individual batteries may be connected in parallel or in series to form a self-charging battery pack 40.

FIG. 8 shows a similar device in which several individual assemblies, each including a battery 11, a solar panel 12 and a diode (not shown) are connected in series and mounted in a long tube with a transparent wall 38. The resulting "power tube" 39 has a positive terminal 41 at one end and a negative terminal 42 at the other or both at a common end.

It was mentioned earlier in this specification that some manufacturers of rechargeable batteries have chosen to mount a "sub-c" wall inside a "D" cell case. The constructions employed in such products suggest other means for mounting the elements of the self-charging battery of the present invention.

FIGS. 12 and 13 show such a prior art construction employed by one battery manufacturer (Eveready) to mount a "sub-c" nickel-cadmium battery 43 in a "D" size case 44. A cylindrical metal cup 45 is attached by means of a press-fit over the base of the "sub-c" battery 43 at the negative end to extend its length to that of the "D" size case 44. The interior of the plastic case 44 has a number of integrally formed longitudinal ribs 46 which extend inwardly from the inside surface of the cylindrical outer shell to the outer cylindrical surface of the "sub-c" battery 43. The ribs 46 hold the battery 43 in a centered, coaxially aligned position inside the case 44.

FIGS. 14 and 15 show a similar prior art construction for mounting a "sub-c" battery 47 in a "D" case 48. In this case, a small diameter cylindrical cup or tube 49 closed at one end is attached to the negative terminal 51 by means of a press-fit, the cup 49 making up the difference between the length of the "sub-c" battery 47 and the "D" case 48. Four longitudinal ribs 52, integrally formed with the case 48, again cradle the small battery 47 in the over-size "D" case 48.

FIGS. 4, 5, and 6 show a somewhat similar approach as proposed in the present invention for mounting a "sub-c" battery 53 in a "D" case 54 but arranging it in an off-center position to leave room for the solar panel 55. In this case, the outer shell of the "D" case is formed in two mating parts, 56 and 57, each comprising a 180 degree longitudinal section of the cylindrical shell of case 54. The two parts 56 and 57 are held together by four tabs 58 that extend downwardly from part 56 to be captured inside four mating depressions 59 in part 57. Two transverse ribs 61, formed integrally inside part 57 and approximately spaced apart from each other, form a cradle for battery 53. The ribs 61 rise above the longitudinal edges 62 of part 57, almost totally encircling the battery 53 and forming at their upper extremities a mounting surface 63 for the support of the solar panel 55. Annular depressions 64 in both ends of parts 56 and 57 hold the circular positive and negative end plates 65 and 66, respectively, of the "D" case. Spacers 67 and 68 are provided at both ends to prevent longitudinal movement of battery 53.

FIGS. 16, 17, and 18 show an implementation of the present invention utilizing the case structure of FIGS. 4, 5, and 6. As shown most clearly in the exploded view of FIG. 16, electrical connections between the battery 53 and the end plates 65 and 66 are made by means of off-set tabs 71 and 72. Tab 71 extends perpendicularly downward from the positive terminal post 73 which passes through the center hole 74 of the positive end plate 65. Tab 72 has a contact pad 70 that is parallel with and abuts against the flat end surface of battery 53 at its negative end. Pad 70 is spaced away from end cap 66 longitudinally by an arm 75 that extends perpendicularly from the lower edge of cap 66. Cap 66, arm 75 and pad 70 are formed from one piece of an electrically conductive material.

The parts of FIG. 16 may be mounted in the case of FIGS. 4-6 as shown in FIGS. 17 and 18 along with the solar cell 55. By virtue of the extending arm 72 which makes up the difference between the length of the "sub-c" battery 53 and the "D" case parts 56 and 57, there is not in this implementation a need for the end spacers 67 and 68 shown in FIG. 6.

FIG. 18 shows a variation from the case design of FIG. 5, the variation intended to cause the battery to take a most favorable position relative to the sun. It is noted that in the arrangement of FIG. 18, when the self-charging battery is placed on a flat surface, it will tend to roll until the internal battery attains a minimum elevation. When this happens, the solar panel is tilted relative to the horizontal so that it may more nearly face the direction of the sun.

FIGS. 19 and 20 illustrate another implementation of the invention utilizing an adaptation of the prior art case construction of FIGS. 14 and 15. An offset tab 76 similar to tab 71 of FIG. 16 but with an elongated terminal post 77 makes connection to the positive terminal 78 of the "sub-c" battery 79. The negative end 81 of battery 79 is spot welded to the "D" size end cap 82 at points 83. The outer shell 84 of the "D" case has a terminal support structure 85 at the negative end, the structure 85 comprising a cylindrical hub 86 that is supported coaxially with shell 84 by means of three short longitudinal ribs 87, two extending horizontally and the third extending vertically downward, leaving clearance above hub 86 for a solar cell 88. Positive and negative end caps 91 and 92, respectively, are secured to the ends of shell 84 by means of tabs 93 that extend perpendicularly from the edges of caps 91 and 92. Tabs 93 are not provided around the upper portions of caps 91 and 92 where they might interfere with the solar cell 88.

An important consideration in connection with the design of the self-charging solar battery of the invention is the provision of a stable mounting platform for the solar cell in a mechanical arrangement that protects the solar cell against physical damage due to shock and vibration. In this regard, it is essential first of all to prevent relative motion between the "sub-c" battery and the solar cell One approach for preventing such relative motion is illustrated in FIG. 11. FIG. 11 shows a "sub-c" battery 95 that has been placed in a shallow cardboard form or boat 96. An encapsulating material 97 is then poured into the boat 96 and allowed to harden. The encapsulating material might be an epoxy, a silicon rubber, tar, bees-wax, or any of a number of nonconductive materials. The negative and positive terminals 98 and 98' clear the surface of the encapsulating material 97 to permit the making of an electrical connection thereto.

FIGS. 21 and 22 illustrate the incorporation of the battery and solar cell sub-assembly of FIG. 11 in yet another implementation of the invention comprising self-charging solar battery 100.

As shown in the exploded view of FIG. 21, the sub-assembly 99 of FIG. 11 is turned upside down, the flat bottom of boat 96 serving as a support or mounting surface for a solar panel 101. A diode 102 has its anode lead 103 soldered to the positive terminal of panel 101 and its cathode lead 104 soldered to the positive terminal 98 of battery 95. A wire 105 connects the negative terminal of panel 101 to the negative terminal of battery 95.

The remaining elements shown in FIG. 21 make up a "D" cell housing. These elements include a transparent cylindrical tube 106, a negative end cap 107, a positive end cap and terminal assembly 108 comprising a metal end cap 109, a first insulating washer 111, a positive terminal 112, and a second insulating washer 113.

Terminal 112 is electrically conductive and has the shape of a top hat with a cup-shaped crown 114 and a disc-shaped rim 115.

Washer 111 has the shape of a disc with a circular opening 116 at its center. Opening 116 is just large enough to receive the crown 114 of terminal 112.

Metal end cap 109 has a disc-shaped body 117 with a centered circular opening 118 that has a diameter somewhat larger than that of opening 116. Spaced about the rim 119 of body 117 are a number of tabs 121, as shown most clearly in FIG. 22.

Insulating washer 113 is identical with washer 111.

The mounting together of elements 109, 111, 112 and 113 to make up the assembly 108 is best illustrated by FIGS. 22 and 23. The crown 114 of terminal 112 is first passed through opening 116 of washer 111. Washer 111 together with terminal 112 is then positioned inside end cap 109 with the crown 114 of terminal 112 passing through the center of opening 118. Washer 113 is then stacked against the exposed face of washer 111 and against the exposed under side of crown 115 of terminal 112. Cap 109, washer 111, terminal 112 and washer 113 are all coaxially aligned and are held in alignment by the turned-up rim 119 of cap 109. To secure the elements of assembly 108 in this configuration, all but four of tabs 121 are bent over against the exposed face of washer 113. The remaining four tabs 121 extend at right angles from body 117 past the outer peripheries of washers 111 and 113. In the completed assembly 108 as just described, terminal 112 extends through opening 118 of cap 109 and is electrically isolated therefrom by virtue of the clearance assured by the centering of crown 114 inside the larger diameter opening 118

Metal end cap 107 is similar to cap 109 but it has only the four perpendicularly extending tabs 121 and it has no center opening.

To complete the assembly of the self-charging solar battery 100, a transparent tube 106 is slipped over the encapsulated assembly including battery 95, boat 96 and solar panel 101. A positive lead wire 122 is soldered at one end to battery terminal 98. Its other end is passed through the center opening of washer 113 and is soldered to terminal 112. A negative lead wire 123 is soldered in place to connect the negative terminals of battery 95 and cell 101 to negative end cap 107. Finally, end cap assembly 108 and end cap 107 are installed in the ends of tube 106, the perpendicularly extending tabs being pressed inside the ends of the tube where they secure the positions of the two end caps by virtue of the tight fit between the tabs and the inside surface of tube 106.

Operation of the self-charging solar battery 100 is the same as that described for battery 10. Battery 100 has an additional feature, however, resulting from the electrical isolation provided between terminal 112 and cap 109.

Battery 10 is subject to being electrically shorted if it is placed on its side on a metal surface. The short circuit occurs when the two end caps 14 and 15 come into contact with the electrically conductive metal surface. In the case of battery 100, caps 107 and 109 may be shorted together with no ill effects because negative terminal 112 remains unshorted.

A self-charging solar battery is thus provided along with a number of adaptations and applications thereof. Although but a few embodiments of the invention have been illustrated and described, it will be apparent to those skilled in the art that various changes and modifications may be made therein without departing from the spirit of the invention or from the scope of the appended claims.

What is claimed is:

1. A self-charging solar battery assembly comprising:
an open-ended cylindrical housing formed at least partially of transparent material,
a rechargeable battery cell means mounted in said housing and comprising positive and negative terminals, one at each end thereof,
a solar electric panel comprising photo-voltaic cell means having positive and negative terminals,
said panel being mounted within said housing with said photo-voltaic cell means juxtapositioned to said transparent material of said housing such that solar rays may pass through said transparent material and excite said photo-voltaic cell means,
a diode means mounted in said housing and comprising an anode and a cathode,
a first means for connecting said positive terminal of said photo-voltaic cell means to said anode and for connecting said cathode to said positive terminal of said battery cell means,
a second means for connecting said negative terminal of said battery cell means to said negative terminal of said photo-voltaic cell means, and
cap means for closing each end of said housing,
a first one of said cap means comprising a positive battery terminal for the battery assembly, and a second one of said cap means forming a negative terminal for the battery assembly,
said first cap means connecting said positive terminal of said battery cell means to said positive terminal of the battery assembly,
said second cap means connecting said negative terminal of said battery cell means to the negative terminal of the battery assembly.

2. The self-charging solar battery assembly set forth in claim 1 wherein:
said one of said cap means comprises a positive cylindrically shaped battery terminal for the battery assembly of a smaller diameter than said cap means which extends axially outwardly of said housing, and said battery assembly duplicates the size and shape of a known "D" size battery.

3. The self-charging solar battery assembly set forth in claim 1 wherein:

said battery cell means comprises a nickel-cadmium battery.

4. The self-charging solar battery assembly set forth in claim 1 wherein:

said battery cell means comprises a sealed lead-acid battery.

5. The self-charging solar battery assembly set forth in claim 1 wherein:

said photo-voltaic cell means comprises a plurality of individual photo-voltaic solar cells connected in a series arrangement.

6. The self-charging solar battery assembly set forth in claim 5 wherein:

said solar cells extend in a side-by-side arrangement laterally of the longitudinal axis of the battery assembly and substantially the full length of said housing.

7. The self-charging solar battery assembly set forth in claim 1 wherein:

said battery cell means comprises a known size "C" battery, and the geometrical configuration of said battery assembly substantially duplicates the geometrical configuration of known size "D" cell batteries.

8. The self-charging solar battery assembly set forth in claim 1 wherein:

said diode means comprises a silicon diode.

9. The self-charging solar battery assembly set forth in claim 1 wherein:

said diode means comprises a germanium diode.

10. The self-charging solar battery assembly set forth in claim 1 wherein:

said battery cell means comprises a cylindrical configuration axially displaced in said housing from the longitudinal axis of said housing.

11. The self-charging solar battery assembly set forth in claim 10 wherein:

said battery cell means comprises a cylindrical configuration axially displaced in said housing in two different directions from the longitudinal axis of said housing, whereby said panel in said housing will be laterally positioned relative to a horizontal position of said housing when the battery assembly is placed on a horizontal surface.

12. A self-charging solar battery assembly comprising:

an open-ended cylindrical housing formed at least partially of transparent material, a plurality of rechargeable battery cell means each comprising positive and negative terminals one at each end thereof, means for connecting said battery cell means in an electrically connected series arrangement, a plurality of solar electric panels each comprising a plurality of photo-voltaic cell means having positive and negative terminals, each of said panels being mounted within said housing, juxtapositioned to a different one of said battery cell means and positioned adjacent said transparent material such that solar rays may pass through said transparent material and excite said photo-voltaic cell means, a plurality of diode means mounted in said housing and each comprising an anode and a cathode, a plurality of first means each for connecting a positive terminal of a different one of said photo-voltaic cell means to an anode of an associated diode means and for connecting the cathode of the associated diode to the positive terminal of the associated battery cell means, a plurality of second means each for connecting the negative terminal of a different one of said battery cell means to the negative terminal of an associated photo-voltaic cell means, and cap means for closing each end of said housing, a first one of said cap means comprising a positive battery terminal for the battery assembly, and a second one of said cap means forming a negative terminal for the battery assembly, said first cap means connecting said positive terminal of said battery cell means to said positive terminal of the battery assembly, said second cap means connecting said negative terminal of said battery cell means to the negative terminal of the battery assembly.

13. An electrical appliance employing a self-charging solar battery assembly for energization thereof comprising:

an appliance energized by electrical energy from a battery and having a housing, said housing formed at least partially of transparent material, an open-ended cylindrical battery housing formed at least partially of a transparent material, said battery housing positioned with said appliance housing with its transparent material juxtaposed to said transparent material of said appliance housing, a rechargeable battery cell means mounted in said battery housing and comprising positive and negative terminals, one at each end thereof, a solar electric panel comprising photo-voltaic cell means having positive and negative terminals, said panel being mounted within said battery housing with said photo-voltaic cell means juxtapositioned to said transparent material of said housing such that solar rays may pass through both said transparent materials and excite said photo-voltaic cell means, a diode means mounted in said battery housing and comprising an anode and a cathode, a first means for connecting said positive terminal of said photo-voltaic cell means to said anode and for connecting said cathode to said positive terminal of said battery cell means, a second means for connecting said negative terminal of said battery cell means to said negative terminal of said photo-voltaic cell means, and cap means for closing each end of said battery housing, a first one of said cap means comprising a positive battery terminal for the battery assembly, and a second one of said cap means forming a negative terminal for the battery assembly, said first cap means connecting said positive terminal of said battery cell means to said positive terminal of the battery assembly, said second cap means connecting said negative terminal of said battery cell means to the negative terminal of the battery assembly.

14. The electrical appliance set forth in claim 13 wherein:

said appliance comprises a flashlight.

15. A flashlight employing a self-charging solar battery assembly comprising:
a flashlight housing formed at least partially of a transparent material,
an open-ended cylindrical battery housing formed at least partially of a transparent material,
a rechargeable battery cell means mounted in said battery housing with its transparent material positioned adjacent the transparent material of said flashlight housing and comprising positive and negative terminals, one at each end thereof,
a solar electric panel comprising photo-voltaic cell means having positive and negative terminals,
said panel being mounted within said battery housing with said photo-voltaic cell means juxtapositioned to said transparent material of said battery housing such that solar rays may pass through said transparent material of said flashlight housing and said battery housing and excite said photo-voltaic cell means,
a diode means mounted in said battery housing and comprising an anode and a cathode,
a first means for connecting said positive terminal of said photo-voltaic cell means to said anode and for connecting said cathode to said positive terminal of said battery cell means,
a second means for connecting said negative terminal of said battery cell means to said negative terminal of said photo-voltaic cell means, and
cap means for closing each end of said battery housing,
a first one of said cap means comprising a positive battery terminal for the battery assembly, and a second one of said cap means forming a negative terminal for the battery assembly,
said first cap means connecting said positive terminal of said battery cell means to said positive terminal of the battery assembly,
said second cap means connecting said negative terminal of said battery cell means to the negative terminal of the battery assembly.

* * * * *